(12) United States Patent
Gou et al.

(10) Patent No.: US 11,191,098 B2
(45) Date of Patent: Nov. 30, 2021

(54) METHOD FOR DETERMINING UPLINK CONTROL CHANNEL SCHEDULING UNIT, BASE STATION AND USER EQUIPMENT

(71) Applicant: ZTE Corporation, Guangdong (CN)

(72) Inventors: Wei Gou, Guangdong (CN); Peng Hao, Guangdong (CN); Xianghui Han, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 101 days.

(21) Appl. No.: 16/872,318

(22) Filed: May 11, 2020

(65) Prior Publication Data

US 2020/0275471 A1     Aug. 27, 2020

Related U.S. Application Data

(63) Continuation of application No. PCT/CN2018/115101, filed on Nov. 12, 2018.

(30) Foreign Application Priority Data

Nov. 10, 2017 (CN) .......................... 201711107748.1

(51) Int. Cl.
   *H04W 72/12* (2009.01)
   *H04L 5/00* (2006.01)
   *H04W 72/04* (2009.01)

(52) U.S. Cl.
   CPC ......... *H04W 72/1284* (2013.01); *H04L 5/001* (2013.01); *H04L 5/0053* (2013.01); *H04W 72/042* (2013.01); *H04W 72/0413* (2013.01)

(58) Field of Classification Search
   CPC ......... H04W 72/1284; H04W 72/0413; H04W 72/042; H04L 5/001; H04L 5/0053
   See application file for complete search history.

(56) References Cited

U.S. PATENT DOCUMENTS

| 2019/0052421 A1* | 2/2019 | Yin ........................ H04B 1/713 |
| 2019/0052422 A1* | 2/2019 | Yin ........................ H04L 5/005 |
| 2020/0280980 A1* | 9/2020 | Myung ................ H04L 5/0053 |

FOREIGN PATENT DOCUMENTS

| CN | 102638333 A | 8/2012 |
| CN | 106160988 A | 11/2016 |

(Continued)

OTHER PUBLICATIONS

Extended European Search Report in EP Patent Application No. 18876226.4, dated Aug. 9, 2021, 14 pages.

(Continued)

*Primary Examiner* — Duc C Ho
(74) *Attorney, Agent, or Firm* — Perkins Coie LLP

(57) ABSTRACT

The present disclosure discloses a method for determining an uplink control channel scheduling unit, a base station, a user equipment, and a computer readable storage medium, including: according to the number of scheduling units occupied by the uplink control channel of the user equipment, the initial scheduling unit used by the uplink control channel, the position of the starting symbol of the uplink control channel in the initial scheduling unit, the number of symbols used, and the agreed rule, the base station determines the subsequent scheduling unit used by the uplink control channel, and/or the position of the symbol used by the uplink control channel in the subsequent scheduling unit.

20 Claims, 2 Drawing Sheets

---

A user equipment receives resource configuration signaling from a base station, and the resource configuration signaling includes the number of scheduling units occupied by an uplink control channel of the user equipment, a start scheduling unit used by the uplink control channel, a start symbol position of the uplink control channel in the start scheduling unit, and the number of symbols used by the uplink control channel in the start scheduling unit. — 201

The user equipment determines a subsequent scheduling unit used by the uplink control channel and/or a position of a symbol used by the uplink control channel in the subsequent scheduling unit according to the resource configuration signaling and an agreed rule. — 202

(56) References Cited

FOREIGN PATENT DOCUMENTS

| CN | 106301695 A | 1/2017 |
|---|---|---|
| EP | 3589058 A1 | 1/2020 |
| WO | 2016/161629 A1 | 10/2016 |

OTHER PUBLICATIONS

Qualcomm Incorporated: "Resource allocation and transmit diversity for PUCCH", 3GPP Draft; R1-1716426 Resource Allocation for PUCCH, 3rd Generation Partnership Project (3GPP), Mobile Competence Centre; 650, Route Des Lucioles ; F-06921 Sophia-Antipolis Cedex; France vol. RAN WG1 No. Prague, CZ; Aug. 21, 2017-Aug. 25, 2017 Sep. 17, 2017 (Sep. 17, 2017), XP051339881, Retrieved from the Internet: URL:http://www.3gpp.org/ftp/Meetings_3GPP_SYNC/RAN1/Docs/ [retrieved on Sep. 17, 2017].

NTT Docomo et al.: "UL data transmission procedures", 3GPP Draft; R1-1718219, 3rd Generation Partnership Project (3GPP), Mobile Competence Centre; 650, Route Des Lucioles ; F-06921 Sophia-Antipolis Cedex; France vol. RAN WG1, No. Prague, CZ; Oct. 9, 2017-Oct. 13, 2017 Oct. 8, 2017 (Oct. 8, 2017), XP051341401, Retrieved from the Internet: URL:http://www.3gpp.org/ftp/Meetings_3GPP_SYNC/RAN1/Docs/ [retrieved on Oct. 8, 2017].

LG Electronics: "Support of long PUCCH over multiple slots for NR", 3GPP Draft; R1-1717961, 3rd Generation Partnership Project (3GPP), Mobii F Competence Centre; 650, Route Des Lucioles ; F-06921 Sophia-Antipolis Cedex; France vol. RAN WG1, No. Prague, CZ; Oct. 9, 2017-Oct. 13, 2017 Oct. 8, 2017 (Oct. 8, 2017), XP051341145, Retrieved from the Internet: URL:http://www.3gpp.org/ftp/Meetings_3GPP_SYNC/RAN1/Docs/ [retrieved on Oct. 8, 2017].

Intel Corporation: Time and frequency domain resource allocation for long PUCCH , 3GPP Draft; R1-1707396 Intel Resource Allocation Long PUCCH, 3rd Generation Partnership Project (3GPP), Mobile Compeience Centre; 650, Route Des Lucioles ; F-06921 Sophia-Antipolis Cedex; France vol. RAN WG1, No. Hangzhou; May 15, 2017-May 19, 2017 May 14, 2017 (May 14, 2017), XP051272608, Retrieved from the Internet: URL:http://www.3gpp.org/ftp/Meetings_3GPP_SYNC/RAN1/Docs/ [retrieved on May 14, 2017].

International Search Report and Written Opinion dated Jan. 30, 2019 for International Application No. PCT/CN2018/115101, filed on Nov. 12, 2018 (12 pages).

\* cited by examiner

US 11,191,098 B2

METHOD FOR DETERMINING UPLINK CONTROL CHANNEL SCHEDULING UNIT, BASE STATION AND USER EQUIPMENT

CROSS-REFERENCE TO RELATED APPLICATIONS

This patent document is a continuation of and claims the benefit of priority to International Patent Application No. PCT/CN2018/115101, filed on Nov. 12, 2018, which claims the benefit of priority to Chinese Patent Application No. 201711107748.1, filed on Nov. 10, 2017. The entire contents of the before-mentioned patent applications are incorporated by reference as part of the disclosure of this application.

TECHNICAL FIELD

The present disclosure relates to, but is not limited to, the field of wireless communication technologies, and in particular, to a method for determining an uplink control channel scheduling unit, a base station and a user equipment.

BACKGROUND

5G NR (New Radio) is an ongoing 3GPP (3rd generation partnership project) study item, which determines a new wireless air interface standard based on orthogonal frequency division multiplexing (OFDM) and will become the foundation for a next generation mobile network.

In an NR system, a scheduling unit (for example, a slot (slot), which will be described with a slot as an example below) has various structures, which may be flexibly configured by a base station. In some cases, a slot may include one or more of the following parts: a downlink transmission part, an uplink transmission part and a guard period (GP) part, and the number of OFDM symbols occupied by each part may be configured. In other words, the number of OFDM symbols used for uplink transmission in one slot varies within a range of 0 to 14.

In the NR system, a Physical Uplink Control Channel (PUCCH) is classified into two categories: a short PUCCH and a long PUCCH. The short PUCCH is mainly used for a user equipment (UE) in the central area of a cell to send timely an Acknowledgement/Negative Acknowledgement (ACK/NACK) feedback or other channel state information (Channel State Information, CSI). The short PUCCH is generally occupies several OFDM symbols located at the end of a slot (for example, 1 or 2 OFDM symbols at the end of a downlink slot; or 1 or 2 OFDM symbols at the end of an uplink slot), or several symbols placed before uplink data in the slot. The long PUCCH is mainly used for UE at the edge of a cell, and occupies more OFDM symbols to improve transmission coverage of the long uplink control channel. The long PUCCH generally includes 4 to 14 OFDM symbols, and is allowed to span multiple slots, and detailed implementation methods are still under discussion.

In the NR system, PUCCH is allowed to span multiple slots. For example, one PUCCH needs more uplink OFDM symbols, but there are not enough OFDM symbols in one slot, and therefore more slots are needed to provide sufficient OFDM symbols. When a base station configures a PUCCH spanning multiple slots for the UE, the base station informs the UE of a start slot of the PUCCH and the number of slots that need to be spanned. For example, the base station informs the UE that the start slot of the PUCCH spanning multiple slots is a slot n and the number of slots that need to be spanned is 4. However, since the slot has a dynamically varying structure, that is, the slots after the slot n includes a downlink-dominated slot (the number of downlink OFDM symbols is more than that of the uplink OFDM symbol in the slot), an uplink-dominated slot (the number of the uplink OFDM symbols is more than that of the downlink OFDM symbol in the slot), an uplink-only slot, a downlink-only slot, a reserved slot, and the like. It is unknown about how will the UE to select the remaining 3 slots except the start slot and schedule resources to meet different communication requirements of the NR system so as to well balance the effective utilization of resources and communication quality.

SUMMARY

The present disclosure provides a method for determining an uplink control channel scheduling unit, a base station and a user equipment, which enables to select, after a start scheduling unit, an appropriate scheduling unit as a scheduling unit of a PUCCH spanning scheduling units.

A technical solution of an embodiment of the present disclosure is implemented as follows.

The embodiment of the present disclosure provides a method for determining an uplink control channel scheduling unit, which includes the following steps:

determining, by a base station, a subsequent scheduling unit used by an uplink control channel and/or a position of a symbol used by the uplink control channel in the subsequent scheduling unit according to the number of scheduling units occupied by the uplink control channel of a user equipment, a start scheduling unit used by the uplink control channel, a start symbol position of the uplink control channel in the start scheduling unit and the number of symbols used by the uplink control channel in the start scheduling unit, and an agreed rule.

An embodiment of the present disclosure also provides a computer readable storage medium storing one or more programs, which are executed by one or more processors to implement any one of the foregoing steps of the method for determining an uplink control channel scheduling unit.

An embodiment of the present disclosure also provides a method for determining an uplink control channel scheduling unit, which includes the following steps:

determining, by a user equipment, a subsequent scheduling unit used by an uplink control channel and/or a position of a symbol used by the uplink control channel in the subsequent scheduling unit according to the number of scheduling units occupied by the uplink control channel, a start scheduling unit used by the uplink control channel, a start symbol position of the uplink control channel in the start scheduling unit and the number of symbols used by the uplink control channel in the start scheduling unit, and an agreed rule.

According to an embodiment of the present disclosure, when a base station configures the user equipment to receive scheduling unit type indication signaling from the base station and the user equipment fails to correctly receive the scheduling unit type indication signaling from the base station, the scheduling unit type indication signaling is used for the base station to indicate a type of a subsequent scheduling unit of the user equipment, and the method further includes: skipping determining, by the user equipment, the subsequent scheduling unit, and determining only the start scheduling unit as a scheduling unit used by the uplink control channel An embodiment of the present disclosure also provides a computer readable storage medium storing one or more programs, which are executed by one or more processors to implement any one of the foregoing steps of the method for determining an uplink control channel scheduling unit.

An embodiment of the present disclosure also provides a base station including:

a first determining unit configured to determine a subsequent scheduling unit used by an uplink control channel and/or a position of a symbol used by the uplink control channel in the subsequent scheduling unit according to the number of scheduling units occupied by the uplink control channel, a start scheduling unit used by the uplink control channel, a start symbol position of the uplink control channel in the start scheduling unit and the number of symbols used by the uplink control channel in the start scheduling unit, and an agreed rule.

An embodiment of the present disclosure also provides a user equipment including:

a second determining unit configured to determine a subsequent scheduling unit used by an uplink control channel and/or a position of a symbol used by the uplink control channel in the subsequent scheduling unit according to the number of scheduling units occupied by the uplink control channel of a user equipment, a start scheduling unit used by the uplink control channel, a start symbol position of the uplink control channel in the start scheduling unit and the number of symbols used by the uplink control channel in the start scheduling unit, and an agreed rule.

The technical solutions of the present disclosure have the following advantageous effects.

According to the method for determining an uplink control channel scheduling unit, the base station and the user equipment provided in the present disclosure, a scheduling unit used by an uplink control channel of a user equipment is determined according to an agreed rule, the technical problem of how to select other appropriate slots after a start slot to carry a PUCCH that spans slots is resolved; and flexible scheduling of resources is achieved simply, thereby satisfying different PUCCH communication requirements and communication quality.

BRIEF DESCRIPTION OF DRAWINGS

The drawings described herein are used to provide a further understanding of the present disclosure and form a part of the present disclosure. The illustrative embodiments of the present disclosure and the description thereof are used to explain the present disclosure but are not intended to limit the present disclosure. In the drawings.

DESCRIPTION OF EMBODIMENTS

To make the objectives, technical solutions, and advantages of the present disclosure clearer, embodiments of the present disclosure will be described in detail below with reference to the accompanying drawings. It shall be noted that the embodiments of the present disclosure and the features in the embodiments may be mutually combined with arbitrarily when they do not conflict with each other.

It shall be specially noted that a slot is taken as an example to illustrate a scheduling unit, and the scheduling unit includes several consecutive OFDM symbols, which may be either an uplink-only scheduling unit or a downlink-only scheduling unit, or a scheduling unit that uplink and downlink are mixed. The slot herein may be a conventional slot, for example, at present, the NR specifies that in a frequency band not exceeding 6 GHz, one slot includes 7 or 14 OFDM symbols, and in a frequency band exceeding 6 GHz, one slot includes at least 14 OFDM symbols with other values to be determined. The slot herein may also be a mini slot (the mini-slot, also referred to as a mini scheduling unit), for example, in the NR, the number of symbols included in a currently defined mini-slot is 1 at least and the total number of symbols in a slot minus 1 at most. Obviously, the number of symbols in the mini-slot varies significantly.

The following embodiments may exist independently, and the technical features in different embodiments may be combined and used in one embodiment. Unless specifically stated herein, PUCCH resources may be short PUCCH resources and/or long PUCCH resources. The PUCCH herein corresponds to a physical uplink control channel (according to transmission characteristics, also referred to as, for example, an uplink control area or uplink control); in the formulation of an NR standard, the PUCCH may also be abbreviated as other abbreviations such as NR-PUCCH, but its original intention is still a physical uplink control channel, and the connotation has not changed, and therefore the addressing is not used to limit the protection scope of the present application.

Figure 1:
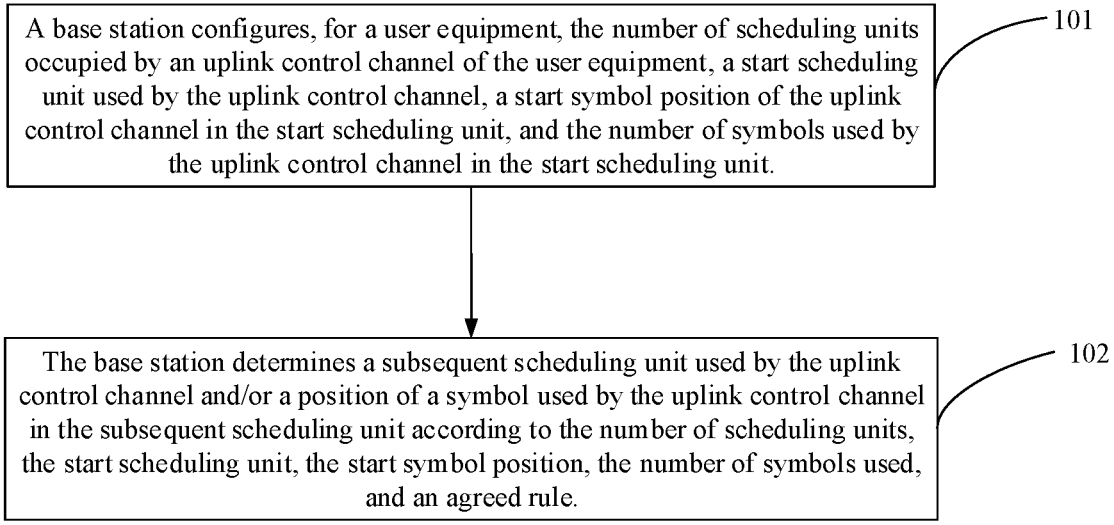
FIG. 1 is a schematic flowchart diagram of a method for determining an uplink control channel scheduling unit provided by an embodiment of the present disclosure.

As shown in FIG. 1, according to the present disclosure, a method for determining an uplink control channel scheduling unit includes the following steps:

step 101: a base station configures, for a user equipment, the number of scheduling units occupied by an uplink control channel of the user equipment, a start scheduling unit used by the uplink control channel, a start symbol position of the uplink control channel in the start scheduling unit, and the number of symbols used by the uplink control channel in the start scheduling unit; and step 102: the base station determines a subsequent scheduling unit used by the uplink control channel and/or a position of a symbol used by the uplink control channel in the subsequent scheduling unit according to the number of scheduling units, the start scheduling unit, the start symbol position, the number of symbols used, and an agreed rule.

It shall be noted that, when the base station configures the user equipment to receive scheduling unit type indication signaling from the base station and the user equipment does not correctly receive the scheduling unit type indication signaling from the base station, the scheduling unit type indication signaling is used for the base station to indicate a type of a subsequent scheduling unit of the user equipment, and the method further includes:

determining, by the user equipment, only the start scheduling unit as a scheduling unit used by the uplink control channel. In this way, the user equipment sends control information of the uplink control channel only in the start scheduling unit used by the uplink control channel indicated in the scheduling unit indication signaling.

In some embodiments, if the base station does not configure the user equipment to receive the scheduling unit type indication signaling from the base station, the step of determining the subsequent scheduling unit used by the uplink control channel according to the agreed rule includes:

determining, by the base station, consecutive n scheduling units starting from the start scheduling unit and including the start scheduling unit, as scheduling units used by the uplink control channel, where n is the number of scheduling units occupied by the uplink control channel.

It shall be noted that, if the base station does not configure the user equipment to receive the scheduling unit type indication signaling from the base station, the user equipment transmits, in consecutive N scheduling units starting from the start scheduling unit used by the uplink control channel indicated in the scheduling unit indication signaling, control information of the uplink control channel.

In some embodiments, the step of determining the subsequent scheduling unit used by the uplink control channel according to the agreed rule includes:

the subsequent scheduling unit has a resource capable of carrying the uplink control channel, and the number of symbols capable of carrying the uplink control channel is greater than or equal to the number of symbols used by the uplink control channel in the start scheduling unit. The symbol is used for an NR system and allowed to be used by an uplink control channel, and the symbol includes an uplink symbol.

In one embodiment of the present disclosure, the step of determining the position of the symbol used by the uplink control channel in the subsequent scheduling unit according to the agreed rule includes:

when a symbol position of the uplink symbol used for carrying the uplink control channel in the subsequent scheduling unit is different from a position of symbols used for the uplink control channel in the start scheduling unit, a start symbol position of the uplink symbol used for carrying the uplink control channel in the subsequent scheduling unit is a position of the first uplink symbol capable of carrying the uplink control channel.

In some embodiments, the step of determining the subsequent scheduling unit used by the uplink control channel and the position of the symbol used by the uplink control channel in the subsequent scheduling unit according to the agreed rule includes:

the subsequent scheduling unit has a resource capable of carrying the uplink control channel, the number of symbols capable of carrying the uplink control channel is greater than or equal to the number of symbols used by the uplink control channel in the start scheduling unit, and a symbol position of the symbol used for carrying the uplink control channel in the subsequent scheduling unit is the same as a position of symbols used for the uplink control channel in the start scheduling unit. The symbol is used for an NR system and allowed to be used by an uplink control channel, and the symbol includes an uplink symbol.

In some embodiments, the step of determining the subsequent scheduling unit used by the uplink control channel according to the agreed rule includes:

the subsequent scheduling unit has a resource capable of carrying the uplink control channel, and the uplink control channel bore by the subsequent scheduling unit and the uplink control channel bore by the start scheduling unit have a same orthogonal cover code (OCC) multiplexing capability.

In one embodiment of the present disclosure, the step of determining the subsequent scheduling unit used by the uplink control channel according to the agreed rule includes:

when the uplink control channel performs frequency hopping, the subsequent scheduling unit has the resource capable of carrying the uplink control channel, and it is satisfied that an orthogonal cover code multiplexing capability corresponding to each frequency hopping of the uplink control channel in the subsequent scheduling unit is the same as an orthogonal cover code multiplexing capability corresponding to each frequency hopping of the uplink control channel in the start scheduling unit.

It shall be noted that when the uplink control channel does not perform frequency hopping in the determined scheduling unit, the OCC multiplexing capability is calculated as a whole.

In some embodiments, the step of determining the subsequent scheduling unit used by the uplink control channel according to the agreed rule includes:

the subsequent scheduling unit has a resource capable of carrying the uplink control channel, and a length of a mother code of a coded bit of the uplink control channel bore by the subsequent scheduling unit is the same as a length of a mother code of a coded bit of the uplink control channel bore by the start scheduling unit.

In some embodiments, a type of the subsequent scheduling unit includes only an uplink scheduling unit and a downlink scheduling unit.

In some embodiments, a type of the subsequent scheduling unit includes only an uplink scheduling unit.

In some embodiments, symbol positions used by the uplink control channel in each of the scheduling units are consecutive.

In some embodiments, the step of determining the subsequent scheduling unit used by the uplink control channel according to the agreed rule includes: a scheduling unit is selected as one of the subsequent scheduling units if the scheduling unit satisfies the following condition: the scheduling unit is capable of providing the same number of symbols and a same symbol position as the uplink control channel transmitted in the start scheduling unit; where the symbol is used for an NR system and allowed to be used by an uplink control channel, and the symbol includes an uplink symbol.

An embodiment of the present disclosure also provides a computer readable storage medium storing one or more programs, which are executed by one or more processors to implement any one of the foregoing steps of the method for determining an uplink control channel scheduling unit.

Figure 2:
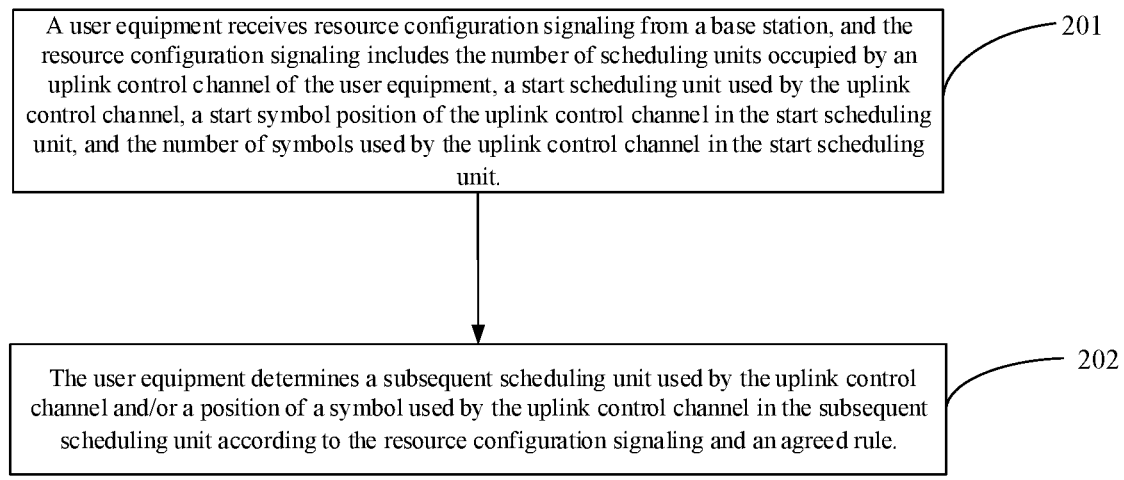
FIG. 2 is a schematic flowchart diagram of a method for determining an uplink control channel scheduling unit provided by an embodiment of the present disclosure.

As shown in FIG. 2, the present disclosure also discloses a method for determining an uplink control channel scheduling unit, which includes the following steps:

step 201: a user equipment receives resource configuration signaling from a base station, and the resource configuration signaling includes the number of scheduling units occupied by an uplink control channel of the user equipment, a start scheduling unit used by the uplink control channel, a start symbol position of the uplink control channel in the start scheduling unit, and the number of symbols used by the uplink control channel in the start scheduling unit; and step 202: the user equipment determines a subsequent scheduling unit used by the uplink control channel and/or a position of a symbol used by the uplink control channel in the subsequent scheduling unit according to the resource configuration signaling and an agreed rule.

In some embodiments, when the base station configures the user equipment to receive scheduling unit type indication signaling from the base station and the user equipment does not correctly receive the scheduling unit type indication signaling from the base station, the scheduling unit type indication signaling is used for the base station to indicate a type of a subsequent scheduling unit of the user equipment, and the method further includes:

skipping determining, by the user equipment, the subsequent scheduling unit, and determining only the start scheduling unit as a scheduling unit used by the uplink control channel.

It shall be noted that, if the base station does not configure the user equipment to receive the scheduling unit type indication signaling from the base station, the user equipment transmits control information of the uplink control channel only in the start scheduling unit used by the uplink control channel indicated in the scheduling unit indication signaling.

In some embodiments, if the base station does not configure the user equipment to receive the scheduling unit type indication signaling from the base station or if the base station does not configure the scheduling unit type indication signaling for the user equipment, the method includes:

determining, by the user equipment, consecutive n scheduling units starting from the start scheduling unit and including the start scheduling unit, as scheduling units used by the uplink control channel, where n is the number of scheduling units occupied by the uplink control channel.

It shall be noted that, if the base station does not configure the user equipment to receive the scheduling unit type indication signaling from the base station, the user equipment transmits, in consecutive n scheduling units starting from the start scheduling unit used by the uplink control channel indicated in the scheduling unit indication signaling, control information of the uplink control channel.

In some embodiments, the step of determining the subsequent scheduling unit used by the uplink control channel according to the agreed rule includes:

the subsequent scheduling unit has a resource capable of carrying the uplink control channel, and the number of symbols capable of carrying the uplink control channel is greater than or equal to the number of symbols used by the uplink control channel in the start scheduling unit. The symbol is used for an NR system and allowed to be used by an uplink control channel, and the symbol includes an uplink symbol.

In some embodiments, the step of determining the subsequent scheduling unit used by the uplink control channel according to the agreed rule includes:

when a symbol position of a symbol used for carrying the uplink control channel in the subsequent scheduling unit is different from a position of symbols used for the uplink control channel in the start scheduling unit, a start symbol position of the symbol used for carrying the uplink control channel in the subsequent scheduling unit is a position of the first symbol capable of carrying the uplink control channel. The symbol is used for an NR system and allowed to be used by an uplink control channel, and the symbol includes an uplink symbol.

In some embodiments, the step of determining the subsequent scheduling unit used by the uplink control channel and the position of the symbol used by the uplink control channel in the subsequent scheduling unit according to the agreed rule includes:

the subsequent scheduling unit has a resource capable of carrying the uplink control channel, the number of symbols capable of carrying the uplink control channel is greater than or equal to the number of symbols used by the uplink control channel in the start scheduling unit, and a symbol position of the symbol used for carrying the uplink control channel in the subsequent scheduling unit is the same as a position of symbols used for the uplink control channel in the start scheduling unit. The symbol is used for an NR system and allowed to be used by an uplink control channel, and the symbol includes an uplink symbol.

In some embodiments, the step of determining the subsequent scheduling unit used by the uplink control channel according to the agreed rule includes:

the subsequent scheduling unit has a resource capable of carrying the uplink control channel, and the uplink control channel bore by the subsequent scheduling unit and the uplink control channel bore by the start scheduling unit have a same orthogonal cover code multiplexing capability.

In one embodiment of the present disclosure, the step of determining the subsequent scheduling unit used by the uplink control channel according to the agreed rule includes:

when the uplink control channel performs frequency hopping, the subsequent scheduling unit has the resource capable of carrying the uplink control channel, and it is satisfied that an orthogonal cover code multiplexing capability corresponding to each frequency hopping of the uplink control channel in the subsequent scheduling unit is the same as an orthogonal cover code multiplexing capability corresponding to each frequency hopping of the uplink control channel in the start scheduling unit.

It shall be noted that when the uplink control channel does not perform frequency hopping in the determined scheduling unit, an OCC multiplexing capability is calculated as a whole.

In some embodiments, the step of determining the subsequent scheduling unit used by the uplink control channel according to the agreed rule includes:

the subsequent scheduling unit has a resource capable of carrying the uplink control channel, and it is satisfied that a length of a mother code of a coded bit of the uplink control channel bore by the subsequent scheduling unit is the same as a length of a mother code of a coded bit of the uplink control channel bore by the start scheduling unit.

In some embodiments, a type of the subsequent scheduling unit includes only an uplink scheduling unit and a downlink scheduling unit.

In some embodiments, a type of the subsequent scheduling unit includes only an uplink scheduling unit.

In some embodiments, symbol positions used by the uplink control channel in each of the scheduling units are consecutive.

In some embodiments, the step of determining the subsequent scheduling unit used by the uplink control channel according to the agreed rule includes: a scheduling unit is selected as one of the subsequent scheduling units if the scheduling unit satisfies the following condition: the scheduling unit is capable of providing the same number of symbols and a same symbol position as the uplink control channel transmitted in the start scheduling unit; where the symbol is used for an NR system and allowed to be used by an uplink control channel, and the symbol includes an uplink symbol.

An embodiment of the present disclosure also provides a computer readable storage medium storing one or more programs, which are executed by one or more processors to implement any one of the foregoing steps of the method for determining an uplink control channel scheduling unit.

Figure 3:
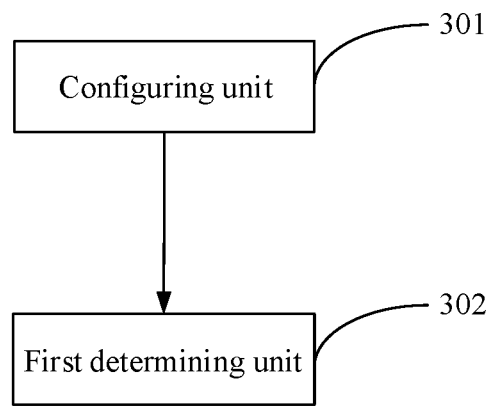
FIG. 3 is a schematic structural diagram of a base station provided by an embodiment of the present disclosure.

As shown in FIG. 3, the present disclosure also discloses a base station including:

a configuring unit 301 configured to configure, for a user equipment, the number of scheduling units occupied by the uplink control channel, a start scheduling unit used by the uplink control channel, a start symbol position of the uplink control channel in the start scheduling unit, and the number of symbols used by the uplink control channel in the start scheduling unit; and a first determining unit 302 configured to determine a subsequent scheduling unit used by the uplink control channel and/or a position of a symbol used by the uplink control channel in the subsequent scheduling unit according to the number of scheduling units, the start scheduling unit, the start symbol position, the number of symbols used, and an agreed rule.

It shall be noted that, when the base station configures the user equipment to receive scheduling unit type indication signaling from the base station and the user equipment does not correctly receive the scheduling unit type indication signaling from the base station, the scheduling unit type indication signaling is used for the base station to indicate a type of a subsequent scheduling unit of the user equipment, and the user equipment determines only the start scheduling unit as a scheduling unit used by the uplink control channel, that is, the user equipment transmits control information of the uplink control channel only in the start scheduling unit used by the uplink control channel indicated in the scheduling unit indication signaling.

In some embodiments, if the base station does not configure the user equipment to receive the scheduling unit type indication signaling from the base station or if the base station does not configure the scheduling unit type indication signaling for the user equipment, the first determining unit 302 is also configured to:

determine consecutive n scheduling units starting from the start scheduling unit and including the start scheduling unit, as scheduling units used by the uplink control channel, where n is the number of scheduling units occupied by the uplink control channel.

It shall be noted that, if the base station does not configure the user equipment to receive the scheduling unit type indication signaling from the base station, the user equipment transmits, in consecutive n scheduling units starting from the start scheduling unit used by the uplink control channel indicated in the scheduling unit indication signaling, control information of the uplink control channel.

In some embodiments, the first determining unit 302 is configured to determine the subsequent scheduling unit used by the uplink control channel according to the agreed rule in a following manner:

the subsequent scheduling unit has a resource capable of carrying the uplink control channel, and the number of uplink symbols capable of carrying the uplink control channel is greater than or equal to the number of symbols used by the uplink control channel in the start scheduling unit.

In one embodiment of the present disclosure, the first determining unit 302 is configured to determine the position of the symbol used by the uplink control channel in the subsequent scheduling unit according to the agreed rule in a following manner:

when a symbol position of an uplink symbol used for carrying the uplink control channel in the subsequent scheduling unit is different from a position of symbols used for the uplink control channel in the start scheduling unit, a start symbol position of the uplink symbol used for carrying the uplink control channel in the subsequent scheduling unit is a position of the first uplink symbol capable of carrying the uplink control channel.

In some embodiments, the first determining unit 302 configured to determine the subsequent scheduling unit used by the uplink control channel and the position of the symbol used by the uplink control channel in the subsequent scheduling unit according to the agreed rule includes:

the subsequent scheduling unit has a resource capable of carrying the uplink control channel, the number of symbols capable of carrying the uplink control channel is greater than or equal to the number of symbols used by the uplink control channel in the start scheduling unit, and a symbol position of the symbol used for carrying the uplink control channel in the subsequent scheduling unit is the same as a position of symbols used for the uplink control channel in the start scheduling unit. The symbol is used for an NR system and allowed to be used by an uplink control channel, and the symbol includes an uplink symbol.

In some embodiments, the first determining unit 302 is configured to determine the subsequent scheduling unit used by the uplink control channel according to the agreed rule in a following manner:

the subsequent scheduling unit has a resource capable of carrying the uplink control channel, and the uplink control channel bore by the subsequent scheduling unit and the uplink control channel bore by the start scheduling unit have a same OCC multiplexing capability.

In one embodiment of the present disclosure, the first determining unit 302 configured to determine the subsequent scheduling unit used by the uplink control channel according to the agreed rule includes:

when the uplink control channel performs frequency hopping, the subsequent scheduling unit has the resource capable of carrying the uplink control channel, and it is satisfied that an orthogonal cover code multiplexing capability corresponding to each frequency hopping of the uplink control channel in the subsequent scheduling unit is the same as an orthogonal cover code multiplexing capability corresponding to each frequency hopping of the uplink control channel in the start scheduling unit.

It shall be noted that when the uplink control channel does not perform frequency hopping in the determined scheduling unit, the OCC multiplexing capability is calculated as a whole.

In some embodiments, the first determining unit 302 is configured to determine the subsequent scheduling unit used by the uplink control channel according to the agreed rule in a following manner:

the subsequent scheduling unit has a resource capable of carrying the uplink control channel, and it is satisfied that a length of a mother code of a coded bit of the uplink control channel bore by the subsequent scheduling unit is the same as a length of a mother code of a coded bit of the uplink control channel bore by the start scheduling unit.

In some embodiments, a type of the subsequent scheduling unit includes only an uplink scheduling unit and a downlink scheduling unit.

In some embodiments, a type of the subsequent scheduling unit includes only an uplink scheduling unit.

In some embodiments, symbol positions used by the uplink control channel in each of the scheduling units are consecutive.

In some embodiments, the step of determining the subsequent scheduling unit used by the uplink control channel according to the agreed rule includes: a scheduling unit is selected as one of the subsequent scheduling units if the scheduling unit satisfies the following condition: the scheduling unit is capable of providing the same number of symbols and a same symbol position as the uplink control channel transmitted in the start scheduling unit; where the symbol is used for an NR system and allowed to be used by an uplink control channel, and the symbol includes an uplink symbol.

Figure 4:
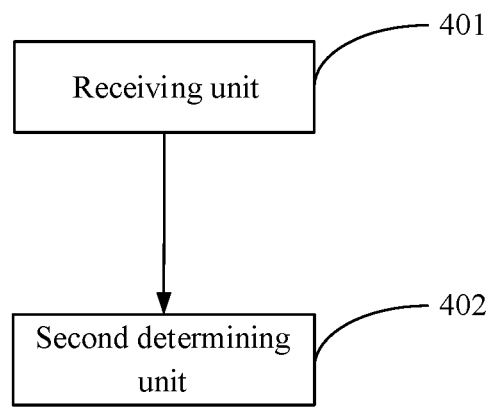
FIG. 4 is a schematic structural diagram of a user equipment provided by an embodiment of the present disclosure.

As shown in FIG. 4, the present disclosure also discloses a user equipment including:

a receiving unit 401 configured to receive resource configuration signaling from a base station, where the resource configuration signaling includes the number of scheduling units occupied by an uplink control channel of a user equipment, a start scheduling unit used by the uplink control channel, a start symbol position of the uplink control channel in the start scheduling unit, and the number of symbols used by the uplink control channel in the start scheduling unit; and a second determining unit 402 configured to determine a subsequent scheduling unit used by the uplink control channel and/or a position of a symbol used by the uplink control channel in the subsequent scheduling unit according to the resource configuration signaling and an agreed rule.

In some embodiments, when the base station configures the user equipment to receive scheduling unit type indication signaling from the base station and the user equipment does not correctly receive the scheduling unit type indication signaling from the base station, the scheduling unit type indication signaling is used for the base station to indicate a type of a subsequent scheduling unit of the user equipment, and the second determining unit 402 is further configured to:

skip determining the subsequent scheduling unit, and only determine the start scheduling unit as a scheduling unit used by the uplink control channel.

It shall be noted that, if the base station does not configure the user equipment to receive the scheduling unit type indication signaling from the base station, the user equipment transmits control information of the uplink control channel only in the start scheduling unit used by the uplink control channel indicated in the scheduling unit indication signaling.

In some embodiments, if the base station does not configure the user equipment to receive the scheduling unit type indication signaling from the base station or if the base station does not configure the scheduling unit type indication signaling for the user equipment, the second determining unit 402 is also configured to:

determine consecutive n scheduling units starting from the start scheduling unit and including the start scheduling unit, as scheduling units used by the uplink control channel, where n is the number of scheduling units occupied by the uplink control channel.

It shall be noted that, if the base station does not configure the user equipment to receive the scheduling unit type indication signaling from the base station, the user equipment transmits, in consecutive n scheduling units starting from the start scheduling unit used by the uplink control channel indicated in the scheduling unit indication signaling, control information of the uplink control channel.

In some embodiments, the second determining unit 402 is configured to determine the subsequent scheduling unit used by the uplink control channel according to the agreed rule in a following manner:

the subsequent scheduling unit has a resource capable of carrying the uplink control channel, and the number of symbols capable of carrying the uplink control channel is greater than or equal to the number of symbols used by the uplink control channel in the start scheduling unit. The symbol is used for an NR system and allowed to be used by an uplink control channel, and the symbol includes an uplink symbol.

In one embodiment of the present disclosure, the second determining unit 402 is configured to determine the subsequent scheduling unit used by the uplink control channel and the position of the symbol used by the uplink control channel in the subsequent scheduling unit according to the agreed rule in a following manner:

when a symbol position of a symbol used for carrying the uplink control channel in the subsequent scheduling unit is different from a position of symbols used for the uplink control channel in the start scheduling unit, a start symbol position of the uplink symbol used for carrying the uplink control channel in the subsequent scheduling unit is a position of the first uplink symbol capable of carrying the uplink control channel. The symbol is used for an NR system and allowed to be used by an uplink control channel, and the symbol includes an uplink symbol.

In some embodiments, the second determining unit 402 is configured to determine the subsequent scheduling unit used by the uplink control channel according to the agreed rule in a following manner:

the subsequent scheduling unit has a resource capable of carrying the uplink control channel, the number of symbols capable of carrying the uplink control channel is greater than or equal to the number of symbols used by the uplink control channel in the start scheduling unit, and a symbol position of the uplink symbol used for carrying the uplink control channel in the subsequent scheduling unit is the same as a position of symbols used for the uplink control channel in the start scheduling unit. The symbol is used for an NR system and allowed to be used by an uplink control channel, and the symbol includes an uplink symbol.

In some embodiments, the second determining unit 402 is configured to determine the subsequent scheduling unit used by the uplink control channel according to the agreed rule in a following manner:

the subsequent scheduling unit has a resource capable of carrying the uplink control channel, and the uplink control channel bore by the subsequent scheduling unit and the uplink control channel bore by the start scheduling unit have a same OCC multiplexing capability.

In one embodiment of the present disclosure, the second determining unit 402 is configured to determine the subsequent scheduling unit used by the uplink control channel according to the agreed rule in a following manner:

when the uplink control channel performs frequency hopping, the subsequent scheduling unit has the resource capable of carrying the uplink control channel, and it is satisfied that an orthogonal cover code multiplexing capability corresponding to each frequency hopping of the uplink control channel in the subsequent scheduling unit is the same as an orthogonal cover code multiplexing capability corresponding to each frequency hopping of the uplink control channel in the start scheduling unit.

It shall be noted that when the uplink control channel does not perform frequency hopping in the determined scheduling unit, the OCC multiplexing capability is calculated as a whole.

In some embodiments, the second determining unit 402 is configured to determine the subsequent scheduling unit used by the uplink control channel according to the agreed rule in a following manner:

the subsequent scheduling unit has a resource capable of carrying the uplink control channel, and it is satisfied that a length of a mother code of a coded bit of the uplink control channel bore by the subsequent scheduling unit is the same as a length of a mother code of a coded bit of the uplink control channel bore by the start scheduling unit.

In some embodiments, a type of the subsequent scheduling unit includes only an uplink scheduling unit and a downlink scheduling unit.

In some embodiments, a type of the subsequent scheduling unit includes only an uplink scheduling unit.

In some embodiments, symbol positions used by the uplink control channel in each of the scheduling units are consecutive.

The present disclosure also provide several preferred embodiments for further illustration, but it shall be noted that the preferred embodiments are only for better description of the present disclosure and are not intended to unduly limit the present disclosure. Each of the following embodiments may exist independently, and the technical features in different embodiments may be combined and used in one embodiment. The PUCCH herein corresponds to a physical uplink control channel (according to transmission characteristics, also referred to as, for example, an uplink control area or uplink control). In the formulation of an NR standard, the PUCCH may also be abbreviated as other abbreviations such as NR-PUCCH, but its original intention is still a physical uplink control channel, and the connotation has not changed, and therefore the addressing does not affect the implementation of the method herein.

In this embodiment, excluding a reserved scheduling unit and/or an unknown scheduling unit and/or a random access channel (RACH) scheduling unit after a start scheduling unit, a scheduling unit is selected from an uplink scheduling unit and a downlink scheduling unit. The downlink scheduling unit includes a downlink-only scheduling unit and a downlink-dominated scheduling unit, and the uplink scheduling unit includes an uplink-only scheduling unit and an uplink-dominated scheduling unit. If the selected scheduling unit is an uplink-dominated scheduling unit, the number of symbols included in the uplink-dominated scheduling unit is required to satisfy a requirement; and if the selected scheduling unit is a downlink-dominated scheduling unit, the number of symbols included in the downlink-dominated scheduling unit is required to satisfy a requirement. The symbol is used for an NR system and allowed to be used by an uplink control channel, and the symbol includes an uplink symbol.

According to a rule, the base station and UE respectively derive the scheduling unit used by the PUCCH starting from the start scheduling unit, and mapping of the PUCCH in the derived scheduling unit. Specifically, the reserved scheduling unit and/or the unknown scheduling unit and/or the RACH scheduling unit after the start scheduling unit are excluded and the scheduling unit is selected from the uplink scheduling unit and the downlink scheduling unit. The downlink scheduling unit includes a downlink-only scheduling unit and a downlink-dominated scheduling unit, and the uplink scheduling unit includes an uplink-only scheduling unit and an uplink-dominated scheduling unit. If the selected scheduling unit is an uplink-dominated scheduling unit, the number of uplink symbols included in the uplink-dominated scheduling unit is required to satisfy a requirement, and if the selected scheduling unit is a downlink-dominated scheduling unit, the number of downlink symbols included in the downlink-dominated scheduling unit is required to satisfy a requirement.

In one carrier, a slot n is indicated as a start slot of the PUCCH. Assuming that the PUCCH is configured to span 3 slots and there are 4 uplink OFDM symbols in each slot to carry the PUCCH, the UE also needs to determine another 2 slots after the slot n to carry the PUCCH. In this embodiment, the base station and the UE determine remaining slots according to the following rule.

If a slot n+1 is a reserved slot, the UE does not select it as a remaining slot to carry the PUCCH; if a slot n+2 is an unknown slot, the UE does not select it as a remaining slot to carry the PUCCH; if a slot n+3 is an uplink slot and the number of uplink symbols included in the slot n+3 satisfies the requirement, for example, 4 consecutive uplink symbols; if a slot n+4 is a downlink slot, and the number of uplink symbols included in the slot n+4 satisfies the requirement, for example, 4 consecutive uplink symbols, the slot n+3 and the slot n+4 are selected as subsequent slots to carry the PUCCH. In this way, the slots carrying the PUCCH of the UE are the slot n, slot n+3 and slot n+4. It shall be noted here that the base station also selects the subsequent slots for receiving the PUCCH according to the same rule. Therefore the base station shall ensure that the symbols carrying the PUCCH in the selected slots are not used for other purposes.

The base station configures a slot type, including an OFDM symbol attribute in the slot, and informs the UE of configuration information of the slot type. Therefore, both the base station and the UE know the slot type, and the UE selects the slot n+3 and the slot n+4 as the subsequent slots carrying the PUCCH according to the agreed rule, which may also be known by the base station. In this way, the UE sends the base station the PUCCH bore on the 3 selected slots. The base station derives the 3 slots (actually only the latter 2 slots, because the first one is indicated by the base station) selected by the UE according to the agreed rule and receives the PUCCH on the derived 3 slots.

There are two supplementary explanations below for some special cases.

Supplement 1:

when a base station informs a UE that signaling about a slot type (currently, the base station may inform the UE of a slot type through downlink control information (DCI) of physical layer or may inform the UE of a slot type through higher-layer signaling) is not correctly received by the UE, the UE is not able to determine the slot type; in this case, the UE may only send the PUCCH in the slot n indicated by the base station, and the UE does not determine a slot after the slot n. If the base station detects the PUCCH sent by the UE in the slot n, and then attempts to receive the PUCCH in the subsequent slot selected by the UE, if the UE fails to receive the PUCCH, it is considered that the UE has lost slot type indication signaling.

Supplement 2:

if a base station does not configure a UE to receive signaling about a slot type (currently, the base station may inform the UE whether to receive configuration information about a slot type), when the PUCCH is configured to require multiple (for example, 3) slots to carry the PUCCH, the base station indicates that a start slot is a slot n, and then the base station needs to configure OFDM symbols in a slot type of consecutive multiple slots (the number of slots required by the PUCCH) after the slot n to satisfy the requirement of carrying the PUCCH. For example, the base station configures the PUCCH of the UE to span 3 slots, the base station configures the start slot to be the slot n, the base station needs to configure the number of OFDM symbols and the position of the OFDM symbols that carry the PUCCH of the UE in types of the slot n+1 and the slot n+2 (if a position of the OFDM carrying the PUCCH in each slot is the same). In this way, when the UE receives that the PUCCH needs to span 3 slots and the start slot is the slot n, UE considers that the slots carrying the PUCCH starts from the indicated start slot n, and the subsequent slot n+1 and slot n+2 are also slots carrying the PUCCH.

In this embodiment, excluding the downlink scheduling unit and/or the reserved scheduling unit and/or the unknown scheduling unit and/or the RACH scheduling unit after the start scheduling unit, the scheduling unit is selected from the uplink scheduling unit. The downlink scheduling unit includes a downlink-only scheduling unit and a downlink-dominated scheduling unit, and the uplink scheduling unit includes an uplink-only scheduling unit and an uplink-dominated scheduling unit. If the selected scheduling unit is an uplink-dominated scheduling unit, the number of uplink symbols included in the uplink-dominated scheduling unit is required to satisfy a requirement.

According to the rule, the base station and UE respectively derive the scheduling unit used by the PUCCH starting from the start scheduling unit, and mapping of the PUCCH in the derived scheduling unit. Specifically, the downlink scheduling unit and/or the reserved scheduling unit and/or the unknown scheduling unit and/or the RACH scheduling unit after the start scheduling unit are excluded and the scheduling unit is selected from the uplink scheduling unit. The downlink scheduling unit includes a downlink-only scheduling unit and a downlink-dominated scheduling unit, and the uplink scheduling unit includes a uplink-only scheduling unit and an uplink-dominated scheduling unit. If the selected scheduling unit is an uplink-dominated scheduling unit, the number of uplink symbols included in the uplink-dominated scheduling unit is required to satisfy a requirement.

In this embodiment, with respect to the foregoing embodiment, only for the plurality of scheduling units required by the PUCCH, the downlink scheduling unit is no longer used as the scheduling unit carrying the PUCCH, and the scheduling unit carrying the PUCCH may only be selected from the uplink scheduling unit.

Specific selection may be made reference to the foregoing embodiment, which will not be repeatedly described here.

In this embodiment, when a scheduling unit is selected, it is required that when the PUCCH spans multiple slots, the number of symbols and the symbol position of the PUCCH in the multiple slots are the same. If the scheduling unit has the number of symbols and the symbol position that satisfy the requirements, the scheduling unit is considered as a subsequent slot for the PUCCH spanning multiple slots.

According to the rule, the base station and UE respectively derive the scheduling unit used by the PUCCH starting from the start scheduling unit, and mapping of the PUCCH in the derived scheduling unit. Specifically, it is required that the PUCCH spans multiple slots, and the number of symbols and the symbol position that are included in the PUCCH in the multiple slots are the same, if the scheduling unit has the number of symbols and the symbol position that satisfy the requirements, the scheduling unit is considered as a slot for the PUCCH spanning multiple slots. Types of slots are not distinguished here, whether there are the number of uplink OFDM symbols and the symbol position available in the slot is only required, that is, no matter what types of the slot are, a slot may be used as a subsequent slot carrying the PUCCH spanning the slots as long as the foregoing number of symbols and symbol position are satisfied.

In one carrier, a slot n is indicated as a start slot of the PUCCH. Assuming that the PUCCH is configured to span 3 slots and there are 4 uplink OFDM symbols (for example, if a serial number of the symbol starts from 0 and a slot includes 14 symbols, 4 uplink OFDM symbols are symbols 3 to 6 in a slot) in each slot to carry the PUCCH, the UE also needs to determine another 2 slots after the slot n to carry the PUCCH. In this embodiment, the base station and the UE determine the remaining slots according to the following rule.

If a slot n+1 is a reserved slot, a slot may be selected as long as the slot has the number of OFDM symbols and the OFDM symbol position that satisfy requirements. Assuming that the slot n+1 does not have the number of OFDM symbols and the OFDM symbol position that satisfy the requirements (these symbols are used for NR and are allowed to be used by the PUCCH, and these slots are skipped if they are reserved for other uses), the UE does not select the slot n+1 as the remaining slot to carry the PUCCH. If a slot n+2 is an unknown slot, the criterion, based on which the UE determines whether the slot n+2 may be selected as a subsequent slot to carry the PUCCH, is still the number of symbols and the symbol position. It is assumed that the slot n+2 does not have the required number of OFDM symbol numbers and required symbol position, if both a slot n+3 and a slot n+4 have the required number of symbols and required symbol position, the slot n+3 and the slot n+4 are selected as subsequent slots carrying the PUCCH, regardless of types of the slot n+3 and the slot n+4. Thus, according to whether there are the required number of symbols as well as the required symbol position in the slot, the slot n+3 and the slot n+4 are selected as subsequent slots to carry the PUCCH. In this way, the slots carrying the PUCCH of UE are the slot n, slot n+3 and slot n+4, where the slot n is indicated by the base station through signaling, and the slot n+3 and slot n+4 are selected by the base station and UE according to the agreed rule.

It shall be noted here that the base station also selects the subsequent slot that receives the PUCCH according to the same rule, and therefore the base station shall ensure that the symbol carrying the PUCCH in the selected slot is not used for other purposes.

The base station configures a slot type, including an OFDM symbol attribute in the slot, and informs the UE of configuration information of the slot type. Therefore, both the base station and the UE know the slot type, and the UE selects the slot n+3 and the slot n+4 as the subsequent slots carrying the PUCCH according to the agreed rule, which may also be known by the base station. In this way, the UE uses the 3 selected slots carrying the PUCCH and sends them to the base station. The base station derives the 3 slots (actually only the latter 2 slots, because the first one is indicated by the base station) selected by the UE according to the agreed rule and receives the PUCCH therefrom. For multiple slots to be spanned by the PUCCH, if there is the number of uplink OFDM symbols and/or the symbol position that satisfy requirements in a slot after the start slot, the base station shall ensure that the uplink OFDM symbols in these slots can be used by the PUCCH. Specifically, the base station knows the rule for determining the subsequent slot, and therefore the base station ensures that the uplink OFDM symbols in the slots that will to be determined to carry the PUCCH are not used by other channels/data.

In this embodiment, when a scheduling unit is selected, it is required that the PUCCH spans multiple slots, and the number of symbols included in the PUCCH in the multiple slots is the same, if the scheduling unit has the number of symbols that satisfies the requirements, the scheduling unit is considered as a slot for the PUCCH spanning multiple slot, and a start symbol position of mapping of the PUCCH in the slot is adjusted.

According to the rule, the base station and UE respectively derive the scheduling unit used by the PUCCH starting from the start scheduling unit, and mapping of the PUCCH in the derived scheduling unit. Specifically, it is required that the PUCCH spans multiple slots, and the number of symbols included in the PUCCH in the multiple slots is the same, if the scheduling unit has the number of symbols that satisfies the requirements, the scheduling unit is considered as a slot for the PUCCH spanning multiple slots, and a start symbol position of mapping of the PUCCH in the slot is adjusted. Types of slots are not distinguished here, whether there is the number of uplink OFDM symbols available in the slot is only required (the symbol position is not required), that is, no matter what types of the slot are a slot may be used as a subsequent slot carrying the PUCCH spanning the slots as long as the foregoing number of symbols is satisfied.

In one carrier, a slot n is indicated as a start slot of the PUCCH, assuming that the PUCCH is configured to span 3 slots and there are 4 uplink OFDM symbols in each slot to carry the PUCCH, the UE also needs to determine another 2 slots after the slot n to carry the PUCCH. In this embodiment, the base station and the UE determine the remaining slots according to the following rule.

If a slot n+1 is a reserved slot, a slot may be selected as long as the slot has the number of OFDM symbols that satisfies requirements. Assuming that the slot n+1 does not have the number of OFDM symbols that satisfies the requirements (these symbols are used for NR and are allowed to be used by the PUCCH, and these slots are skipped if they are reserved for other uses), the UE does not select the slot n+1 as the remaining slot to carry the PUCCH. If a slot n+2 is an unknown slot, the criterion, based on which the UE determines whether the slot n+2 may be selected as a subsequent slot to carry the PUCCH, is still the number of symbols. It is assumed that the slot n+2 does not have the number of OFDM symbols that satisfies the requirements, if both a slot n+3 and a slot n+4 have the number of symbols that satisfies the requirements, the slot n+3 and the slot n+4 are selected as subsequent slots carrying the PUCCH, regardless of types of the slot n+3 and the slot n+4. In some embodiments, if a symbol position corresponding to the required number of OFDM symbols in the slot n+3 is also the same as a symbol position used by the PUCCH in the slot n, the symbol position that is the same as the slot n is used in the slot n+3 to carry the PUCCH. If there are the required number of OFDM symbols in the slot n+4, but a symbol position corresponding to the required number of OFDM symbols in the slot n+4 is different from a position of the symbol carrying the PUCCH in the slot n. It is assumed here that the number of symbols carrying the PUCCH in the slot n is 4, which are symbols 3 to 6 (if a serial number of symbols in the slot starts from 0), the selected position of the symbols carrying the PUCCH in the slot n+3 is the same as that of the slot n. Assuming that the number of symbols carrying the PUCCH in the slot n+4 is also 4, however there are 10 uplink symbols with symbol positions of 4 to 14, in this case, the symbols carrying the PUCCH are adjusted to consecutive 4 symbols starting from the first uplink symbol in the slot n+4, that is, symbols 4 to 7. In other words, serial numbers of the selected symbol carrying the PUCCH in the slot n+4 is 4 to 7. Obviously, the positions of the symbols carrying the PUCCH in the slot n+4 are adjusted, and are different from the symbol positions in the slot n and slot n+3. In this embodiment, it is implied that the adjusted symbol position starts from the first uplink symbol in the slot (or the UE knows about the slot), and the adjusted rule shall also be agreed by the base station and the UE in advance.

Thus, according to whether there is the number of symbols that satisfies the requirement in the slot, the slot n+3 and the slot n+4 are selected as subsequent slots to carry the PUCCH, and the positions of the symbols carrying the PUCCH in the slot n+4 are adjusted. In this way, the slots carrying the PUCCH of UE are slot n, slot n+3 and slot n+4, where the slot n is indicated by the base station through signaling, and the slot n+3 and slot n+4 are selected by the base station and UE according to the agreed rule.

It shall be noted here that the base station also selects the subsequent slot receiving the PUCCH and the position of the symbol carrying the PUCCH in the slot according to the same rule, and therefore the base station shall ensure that the symbol carrying the PUCCH in the selected slot is not used for other purposes.

The base station configures a slot type, including an OFDM symbol attribute in the slot (an uplink symbol, a downlink symbol or a reserved symbol or a GP symbol, or the like), and informs the UE of configuration information of the slot type. Therefore, both the base station and the UE know the slot type, and the UE selects the slot n+3 and slot n+4 as the subsequent slots carrying the PUCCH according to the agreed rule, the start symbol carrying the PUCCH in the slot n+4 is also adjusted, and the base station may also be known according to the agreed rule of adjusting a symbol position. In this way, the UE sends the base station the PUCCH bore on the 3 selected slots. The base station derives the 3 slots (actually only the latter 2 slots, because the first one is indicated by the base station) selected by the UE according to the agreed rule and receives the PUCCH therefrom. For multiple slots to be spanned by the PUCCH, if there is the number of uplink OFDM symbols and/or the symbol position that satisfy requirements in a slot after the start slot, the base station shall ensure that the uplink OFDM symbols in these slots can be used by the PUCCH. Specifically, the base station knows the rule for determining the subsequent slot, and therefore the base station ensures that the uplink OFDM symbols in the slots that will to be determined to carry the PUCCH are not used by other channels/data.

In the described method of the foregoing embodiments, the embodiments may be used in combination without conflict.

For example, technical features of the foregoing two embodiments are combined, when the UE selects a subsequent slot, reserved slot and unknown slot are first excluded according to their slot types, and a downlink or uplink slot after the start slot is selected as long as the number of uplink symbols and the position of symbols included in the downlink slot or uplink slot are the same as the number of symbols and the position of the symbols carrying the PUCCH in the start slot of the PUCCH. Reference may be made to the corresponding embodiments described above for the sake of complete description.

For example, technical features of the foregoing two embodiments are combined, when the UE selects a subsequent slot, reserved slots, unknown slots and downlink slots are first excluded according to their slot types, and an uplink slot after the indicated start slot is selected as long as the number of uplink symbols included in the uplink slot is the same as the number of symbols carrying the PUCCH in the start slot of the PUCCH. If the uplink symbol position in the slot is different from the symbol position of the PUCCH in the start slot, the symbol position of the PUCCH in the slot is adjusted according to the agreed rule. Reference may be made to the corresponding embodiments described above for the sake of complete description.

For example, technical features of the foregoing two embodiments are combined, when the UE selects a subsequent slot, reserved slots and unknown slots are first excluded according to their slot types, and a downlink or uplink slot after the indicated start slot is selected as long as the number of uplink symbols included in the downlink or uplink slot is the same as the number of symbols carrying the PUCCH in the start slot of the PUCCH. If the uplink symbol position in the downlink or uplink slot is different from the symbol position of the PUCCH in the start slot, the symbol position of the PUCCH in the downlink or uplink slot is adjusted according to the agreed rule. Reference may be made to the corresponding embodiments described above for the sake of complete description.

For example, technical features of the foregoing two embodiments are combined, when the UE selects a subsequent slot, reserved slots, unknown slots and downlink slots are first excluded according to their slot types, and an uplink slot after the indicated start slot is selected as long as the number of uplink symbols and position of symbols included in the uplink slot are the same as the number of symbols and the position of the symbols carrying the PUCCH in the start slot of the PUCCH. Reference may be made to the corresponding embodiments described above for the sake of complete description.

This embodiment also includes that the base station indicates for the UE which manner is used to determine the subsequent slot when the PUCCH spans multiple slots. For example, the manners in the embodiments are supported by one system, then the base station may inform the UE through signaling (including higher-layer signaling or physical layer signaling or medium access control (MAC) layer signaling) of which specific manner is used to determine the slot to be spanned by the PUCCH. The higher-layer signaling may be a broadcast RRC message or a UE dedicated radio resource control (RRC) message. The physical layer signaling may be bore by DCI, which may be public DCI or UE-specific DCI. The MAC layer signaling may be a control unit of the MAC layer. This indication may increase robustness of the system.

Different from the foregoing embodiment, this embodiment solves the problem of, when one PUCCH spans multiple slots, how to specifically determine the number of symbols of the PUCCH in each slot among the multiple slots if the PUCCH is allowed to have different number of OFDM symbols in each slot.

When the PUCCH (the PUCCH corresponding to UCI of 1 bit or 2 bits) spans multiple slots, a subsequent slot may be selected if the following requirement is satisfied: if the PUCCH is bore, an OCC multiplexing capability of the PUCCH is required to be the same as a multiplexing capability of the PUCCH bore in the start slot. When the PUCCH performs frequency hopping in a slot, OCC multiplexing capabilities of each frequency hopping are calculated separately, and when the PUCCH does not perform frequency hopping in the slot, the OCC multiplexing capability is calculated as a whole.

The PUCCH may have different formats according to the number of bits transmitted, and the number of symbols included is greater than 4. For example, a PUCCH transmission format, which is set for transmitting information of 1 bit or 2 bits, is OCC multiplexing mode in the time domain and is denoted as format 1; a PUCCH transmission format, which is set for transmitting more than 3 bits and less than X bits, is in a frequency-time OCC multiplexing mode; and a PUCCH transmission format, which is set for transmitting more than X bits, does not support multiplexing.

If the foregoing PUCCH formats are sent across multiple slots, the following describes the case where the number of symbols used to carry the PUCCH among the multiple slots is different. For example, the PUCCH needs to span three slots, however the number of uplink symbols available for the PUCCH in the three slots is not exactly equal. It is required to deal with the case where the number of symbols carrying the PUCCH in the multiple slots is not equal. For example, the first slot and the second slot only have one symbol for the PUCCH, and the third slot has 8 symbols; and such a PUCCH structure across multiple slots is obviously not optimal. It is thus required to design the optimal different number of symbols in each slot in the case where the number of symbols carrying the PUCCH in the multiple slots is not equal. One method is described below.

In general, for a PUCCH that spans multiple slots, the base station indicates the start slot of the PUCCH, and configures a start symbol and length (the number of symbols) in the start slot and the number of slots. It is required to determine the subsequent slots and to determine characteristics of the subsequent slots to be selected. One way is that for the foregoing PUCCH format 1 (refer to PUCCH format 1 or a structure of the PUCCH carrying 1 bit or 2 bits in the existing NR), when multiple slots are spanned, a difference value of the number of symbols carrying the PUCCH between slots is limited by an OCC multiplexing capability. For the selection of subsequent slots, a basic principle is that when there is a subsequent slot to carry the PUCCH, if the PUCCH has the same OCC multiplexing capability in the slot as the PUCCH bore in the start slot, the slot can be selected. If the PUCCH performs frequency hopping within the slot, for the selection of the subsequent slot, the basic principle is slightly changed to that when there is a subsequent slot to carry the PUCCH, if the PUCCH has the same OCC multiplexing capability in the slot as each frequency hopping of the PUCCH bore in the start slot, the slot can be selected.

In one embodiment of the present disclosure, the base station configures the PUCCH spanning multiple slots for the UE, and informs the UE of the information about the start slot, the start symbol and the number of symbols for the PUCCH in the start slot, the number of slots that the PUCCH needs to span, and whether frequency hopping is performed. Then the base station and UE agree to determine the subsequent slot used by the PUCCH according to the foregoing principle. The UE continues sending the PUCCH on the selected slot, and the base station continues receiving the PUCCH on the slot. It is assumed that the base station configures the PUCCH of the UE to span 2 slots, the start slot is a slot n, and the PUCCH uses 7 symbols in the start slot in which a start symbol is a symbol 3 (a serial number starts from 0), and frequency hopping is not performed, for the PUCCH, one more slot is needed subsequently. Here, assuming that there is no uplink symbol in a slot n+1, the slot n+1 is not selected, and the slot n+2 has 6 uplink symbols that may be used. It can be found in Table 1 that when the PUCCH does not perform frequency hopping and the number of symbols is 6 or 7, the OCC multiplexing capability is the same for the 6 symbols and 7 symbols, and therefore the slot n+2 may be selected to carry the PUCCH at this time. Thus, the slots used by the PUCCH are the slot n and the slot n+2.

In some embodiments, a principle for selection of the subsequent slot may also as follows: when the PUCCH is transmitted, whether start positions of the symbols used in the slots are the same. For example, when a strict condition is set, the start symbols of the PUCCH in multiple slots are also required to be the same. For another example, when a strict condition is set, the start symbols of the PUCCH in multiple slots are not required to be the same as long as OCC multiplexing capability remains the same, however the position of the start symbol of the PUCCH in the slot shall be agreed, for example, to be the first available uplink symbol in the slot.

For selection of the subsequent slot of the PUCCH configured to span multiple slots, an OCC multiplexing capability of the PUCCH in the selected subsequent slot is the same as an OCC multiplexing capability of the PUCCH in the start slot. In this case, the number of symbols used for the PUCCH in the subsequently selected slot may not be equal to the number of symbols used for the PUCCH in the start slot, that is, the number of symbols used for carrying the PUCCH in the multiple slots may not be equal to each other (certainly, they may also be equal). The position of the symbol carrying the PUCCH in the selected slot may also be allowed to be adjusted, and an adjustment rule may be agreed. In this way, there will be more slots for UE to select.

TABLE 1

| Number of PUCCH symbols | OCC multiplexing capability | |
|---|---|---|
| | Support frequency hopping | Not support frequency hopping |
| 4 | 1 | 2 |
| 5 | 1 | 2 |
| 6 | 1 | 3 |
| 7 | [1] Note that it may be 2 here, which does not affect the essence of the present disclosure | 3 |
| 8 | 2 | 4 |
| 9 | 2 | 4 |
| 10 | 2 | 5 |
| 11 | [2] Note that it may be 3 here, which does not affect the essence of the present disclosure | 5 |
| 12 | 3 | 6 |
| 13 | 3 | 6 |
| 14 | 3 | 7 |

In another embodiment of the present disclosure, the PUCCH supports frequency hopping in the agreed principle. In this case, when a subsequent slot is selected, the slot needs to satisfy: if the PUCCH is bore in the slot and performs frequency hopping, an OCC multiplexing capability of the first frequency hopping is the same as an OCC multiplexing capability of the first frequency hopping of the PUCCH in the start slot, and an OCC multiplexing capability of the second frequency hopping is the same as an OCC multiplexing capability of the second frequency hopping of the PUCCH in the start slot. In this way, the slot may be selected. If a more strict condition is set, it may require that the start symbol carrying the PUCCH in the slot is the same as the start symbol carrying the PUCCH in the start slot.

In this embodiment, when the scheduling unit is selected, the PUCCH (for a PUCCH corresponding to UCI greater than 3 bits) spans multiple slots, and the subsequent slot may be selected if the following requirement is satisfied: if the PUCCH is bore, a length of a mother code of the PUCCH bore in the slot is required to be the same as a length of a mother code of the PUCCH in the start slot (a frequency domain resource is the same as the start slot).

For the PUCCH carrying greater than 2 bits of information, since the OCC multiplexing in the time domain is not supported, a principle of selecting a subsequent slot is different when the PUCCH spans multiple slots. When the PUCCH spans multiple slots, the subsequent slot selection satisfies the following condition: if the PUCCH is bore in the slot, a length of a mother code of a coded bit of the PUCCH bore by a resource (including a time domain and a frequency domain, where the time domain is a symbol, the frequency domain is a PRB) used for carrying the PUCCH in the slot is the same as a length of a mother code of a coded bit of the PUCCH in the start slot, and in this case the slot is selected.

If a strict condition is further set, it may be required that the number of frequency domain resources may not be allowed to be increased (that is, a frequency domain resource used for the PUCCH in the slot is the same size as a frequency domain used for the PUCCH in the start slot). It may also be required that a start symbol of the PUCCH in the slot is the same as a start symbol in the start slot. It may also be required that a code rate of the coded bit of the PUCCH bore in the slot exceeds a certain threshold. Although the coded bits are from the same mother code, decoding performance is reduced if the code rate is too large, and therefore a reasonable code rate threshold is set to ensure the decoding performance. The threshold of the code rate may be obtained through simulation, or a certain value of the code rate may be selected from the code rates allowed for the PUCCH. It shall be emphasized here that one or more of the foregoing conditions may be used in combination or alone.

According to the method of the scheduling unit for the uplink control channel, the base station and the user equipment provided in the present disclosure, a scheduling unit used by an uplink control channel of a user equipment is determined according to an agreed rule, the problem of how to determine which slots are selected to carry a PUCCH spanning multiple slots after a start slot is resolved. The present disclosure provides a variety of solutions, in which the slot may be determined using an agreed rule without requiring additional signaling notification.

In the present application, technical features in various embodiments may be combined in one embodiment without conflict. Each embodiment is only an optimal embodiment of the present application and is not intended to limit the protection scope of the present application.

A technical problem provided by this embodiment is: how to determine multiplexing modes of a de-modulation reference signal (DMRS) and data when the UE transmits the data according to a maximum processing capability of the UE. The multiplexing modes are time division multiplexing (TDM) or frequency division multiplexing (FDM). The maximum processing capability of the UE here refers to a minimum duration required for receiving, by the UE, a physical downlink control channel (PDCCH) sent by a base station to schedule uplink data (including DMRS required for data), decoding the PDCCH, and preparing for uplink data according to PDCCH scheduling information until the uplink data may be sent, which is denoted as N2 here. The stronger the UE processing capability is, the smaller the value of N2 is. Generally, a capability value N2 of the UE is reported to the base station.

In practice, since there is a time offset between the uplink and the downlink when data is transmitted, the base station also configures a TA value to the user for a time unit in advance by the user when data is transmitted. Therefore, a minimum spacing from the last symbol of the PDCCH that schedules user data to the first data symbol that a user may actually send the PUSCH is related to both N2 and TA. The minimum number of symbols from the last symbol of the PDCCH to the first data symbol of the PUSCH may be denoted as K2, that is, K2 is related to a capability of UE, N2 and TA. For example, the last symbol of PDCCH is on the symbol n, if the PUSCH scheduled by the PDCCH to the user starts from a symbol n+K2 or n+K2, the UE has the ability to start transmitting data from n+K2. In order to reduce complexity of the user, or in order to leave more time for the user to prepare for data transmission, only DMRS may be transmitted on the first symbol of the PUSCH by default and data is not transmitted. Since the DMRS may be prepared in advance, the user has time of one more symbol to prepare for the transmission of data in the PUSCH.

However, the default method brings a lot of overhead. Since it is always considered that the DMRS and the data are TDM, that is, they are not transmitted at the same time, even if a DMRS does not occupy all subcarriers of the first symbol, these unoccupied subcarriers cannot be used for data transmission.

Provided is a method for limiting a multiplexing mode of a DMRS port. If the base station dynamically configures that the first symbol of the PUSCH is after a (K2+X)-th symbol after the last symbol of the PDCCH, the multiplexing mode of the DMRS and the data of the PUSCH includes FDM and TDM. The multiplexing mode of the PUSCH and the DMRS described herein refers to a multiplexing mode between the first DMRS symbol or the first 2 consecutive DMRS symbols and the PUSCH.

If the base station dynamically configures that the first symbol of the PUSCH is on a (K2+X)-th symbol after the last symbol of the corresponding PDCCH, the multiplexing mode of the DMRS and the data of the PUSCH only includes TDM.

Optionally, if the base station dynamically configures that the first symbol of the PUSCH is on or before a (K2+X)-th symbol after the last symbol of the corresponding PDCCH, and does not precede a K2-th symbol after the last symbol of the PDCCH, the multiplexing mode of the DMRS and the data of the PUSCH only includes TDM.

If the base station dynamically configures that the first symbol of the PUSCH is before a (K2+X)-th symbol after the last symbol of the corresponding PDCCH, obviously, the user does not have enough time to prepare for data transmission, and the user does not send the data in this case.

K2 is calculated based on the capability N2 of the user.

Assuming that the last symbol of the PDCCH is on a symbol n in a slot, after K2 is calculated according to the capability N2 of the user, the base station shall generally schedule that the first symbol of the PUSCH of the user cannot precede a symbol n+K2, otherwise the user does not have enough time to prepare. According to the present disclosure, if the base station configures to the user that the first symbol of the PUSCH is between a (n+K2)-th symbol and a (n+K2+X)-th symbol, the multiplexing mode of the DMRS and the data of the PUSCH only includes TDM. Since the data is not transmitted on the first PUSCH symbol at this time but only the DMRS is transmitted, which enables to win a symbol of preparation time to the user for transmitting data. However, if the base station configures to the user that the first symbol of the PUSCH is after a (n+K2+X)-th symbol, the multiplexing mode of the DMRS and the data of the PUSCH includes TDM and FDM. In this case, the user has enough time to prepare for data transmission, and a resource utilization rate could be effectively improved if the data is transmitted on the first symbol of the PUSCH, where n is an integer.

When X is equal to 0, if the base station configures to the user that the first symbol of the PUSCH is on a symbol n+K2, there is no data transmission on the first symbol of the PUSCH, that is, the DMRS and the data are TDM. However, if the base station configures to the user that the first symbol of the PUSCH is after the symbol n+K2, the data may be transmitted on the first symbol of the PUSCH, that is, the multiplexing mode of the DMRS and the data include TDM and FDM. If the DMRS on the PUSCH is configured with 2 consecutive DMRS symbols, the multiplexing modes of the DMRS and the data on the two symbols are the same.

X is an integer greater than or equal to 0. X may be predefined, for example, X is predefined to be 0, or can be configured for the user by higher-layer signaling.

Figure 5:
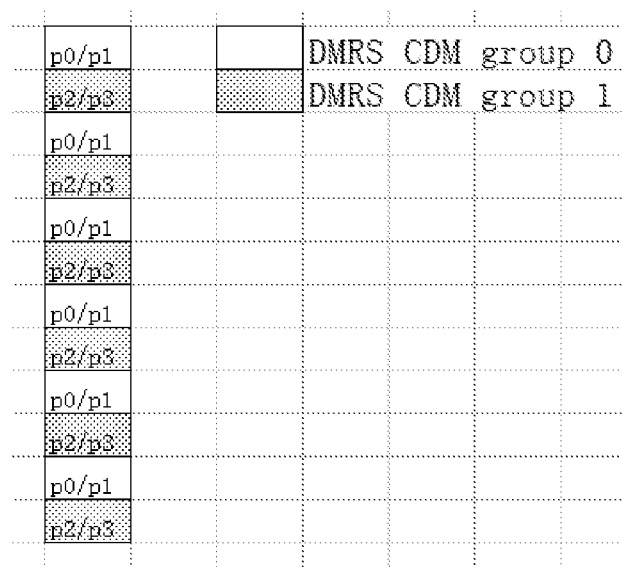
FIG. 5 is a schematic structural diagram of a DMRS pattern provided by an embodiment of the present disclosure.

As shown in FIG. 5, a total of 4 ports are supported on one DMRS symbol and the 4 ports are divided into 2 orthogonal code division multiplexing (CDM) groups. Ports p0 and p1 correspond to a CDM group 0, and ports p2 and p3 correspond to a CDM group 1. Generally, when a base station allocates port 0 or 1 to a user, the base station needs to inform the user UE0 whether there are other users transmitting DMRS on the CDM group 1. If yes, as shown in column 5 of indexes 0 and 2 in Table 2 below indicating that there may be transmission of the DMRS by other users on the CDM group 1, the UE0 cannot transmit data on the CDM group 1. In this way, for the UE0, on the symbol of the DMRS, the DMRS and the data are TDM. However, as shown in indexes 1 and 3 in Table 2, if there are no other users in the CDM group to send the DMRS, the UE0 transmits data on the CDM group 1.

According to the foregoing description, if the base station configures to the user that the first symbol of the PUSCH is between a (n+K2)-th symbol and a (n+K2+X)-th symbol, the indexes 1 and 3 in Table 2 are prohibited, because the multiplexing mode of the DMRS and the data of the PUSCH only includes TDM, however, indexes 1 and 3 include an FDM mode. In other words, when the base station configures to the user that the first symbol of the PUSCH is between the (n+K2)-th symbol and the (n+K2+X)-th symbol, the user does not want to be configured with some DMRS port configuration, which includes data transmission on the symbol of the DMRS. However, if the base station configures to the user that the first symbol of the PUSCH is after the (n+K2+X)-th symbol, there is no limitation.

TABLE 2

| Index | Layers | DMRS port(s) | DMRS symbols | Coscheduled DMRS CDM group | Scrambling ID | Number of code words (CWs) |
|---|---|---|---|---|---|---|
| 0 | 1 | 0 | 1 | 1 | 0 | 1 |
| 1 | 1 | 0 | 1 |   | 0 | 1 |
| 2 | 1 | 1 | 1 | 1 | 0 | 1 |
| 3 | 1 | 1 | 1 |   | 0 | 1 |
| ... | ... | ... | ... | ... | ... | ... |

In other words, if the base station configures to the user that the first symbol of the PUSCH is between the (n+K2)-th symbol and the (n+K2+X)-th symbol, on the first symbol or first two symbols of the PUSCH, all resources other than the resources used for the user DMRS port transmission are not used for the user to transmit the data. If the base station configures to the user that the first symbol of the PUSCH is after the (n+K2+X)-th symbol, on the first symbol or the first two symbols of the PUSCH, whether the remaining resources other than the resources used for the DMRS port transmission of the user are used for the data transmission of the user needs to be indicated by the base station with physical layer dynamic signaling.

In addition, for X, K2, K2+X, they may be a non-negative integer, and the symbol is used as a unit. They may also be a non-negative decimal number, which is counted according to a duration, for example nanoseconds.

A person of ordinary skill in the art may understand that all or a part of the steps of the foregoing method may be implemented by a program instructing corresponding hardware, the program may be stored in a computer readable storage medium, for example, a read-only memory, a magnetic disk, an optical disk or the like. Optically, all or a part of the steps of the foregoing method may be implemented by using one or more integrated circuits. Accordingly, each module/unit in the foregoing embodiments may be implemented in the form of hardware or software functional modules. The present disclosure is not limited to any specific form of combination of hardware and software.

The foregoing description is only a preferred embodiment of the present disclosure and is not intended to limit the present disclosure, and various modifications and changes may be made to the present disclosure for a person of skilled in the art. Any modification, equivalent substitution, improvement or the like, made within the spirit and principle of the present disclosure, shall fall within the protection scope of the present disclosure.

What is claimed is:

1. A method for wireless communication, comprising:
receiving, by a user equipment, configuration information from a base station configuring multiple slots for a transmission on an uplink control channel, wherein the configuration information indicates (1) a starting slot for the transmission on the uplink control channel, (2) a number of slots for the transmission on the uplink control channel, (3) a starting symbol in a slot for the transmission on the uplink control channel, and (4) a number of symbols in a slot for the transmission on the uplink control channel;
determining, by the user equipment according to the configuration information, a subsequent slot in the multiple slots and a symbol in the subsequent slot for the transmission on the uplink control channel, wherein a number of symbols available for carrying the transmission on the uplink control channel in the subsequent slot is greater than or equal to the configured number of symbols, and wherein one or more symbols in the subsequent slot for the transmission on the uplink control channel have a same position as one or more symbols in the starting slot according to the configuration information; and
performing, by the user equipment, the transmission on the uplink control channel using at least the starting slot and the subsequent slot.

2. The method of claim 1, wherein a capability of orthogonal cover code multiplexing is enabled for the starting slot and the subsequent slot for the transmission on the uplink control channel.

3. The method of claim 1, comprising:
performing, by the user equipment, frequency hopping for the transmission on the uplink control channel using a same capability of orthogonal cover code multiplexing in the subsequent slot as in the starting slot, wherein N consecutive slots from the starting slot are used for the transmission on the uplink control channel, the N consecutive slots including the starting slot.

4. The method of claim 1, wherein the one or more symbols in each of the multiple slots are consecutive symbols.

5. The method of claim 1, comprising:
determining, by the user equipment, that a slot is not used for the transmission on the uplink control channel due to the slot not having the configured number of symbols.

6. A method for wireless communication, comprising:
transmitting, by a base station, configuration information to a user equipment configuring multiple slots for a transmission on an uplink control channel, wherein the configuration information indicates (1) a starting slot for the transmission on the uplink control channel, (2) a number of slots for the transmission on the uplink control channel, (3) a starting symbol in a slot for the transmission on the uplink control channel, and (4) a number of symbols in a slot for the transmission on the uplink control channel; and
receiving, by the base station, the transmission on the uplink control channel from the user equipment using at least the starting slot and a subsequent slot, wherein the subsequent slot and a symbol in the subsequent slot for the transmission on the uplink control channel are determined according to the configuration information, wherein a number of symbols available for carrying the transmission on the uplink control channel is greater than or equal to the configured number of symbols, and wherein one or more symbols in the subsequent slot for the transmission on the uplink control channel have a same position as one or more symbols in the starting slot according to the configuration information.

7. The method of claim 6, wherein N consecutive slots from the starting slot are used for the transmission on the uplink control channel, and wherein the N consecutive slots include the starting slot.

8. The method of claim 6, wherein a capability of orthogonal cover code multiplexing is enabled for the starting slot and the subsequent slot for the transmission on the uplink control channel.

9. The method of claim 6, wherein frequency hopping is performed for the transmission on the uplink control channel using the same capability of orthogonal cover code multiplexing in the subsequent slot as in the starting slot.

10. The method of claim 6, wherein the one or more symbols in each of the multiple slots are consecutive symbols.

11. An apparatus for wireless communication, comprising:
a processor; and
a memory including processor executable code, wherein the processor executable code upon execution by the processor configures the processor to:
receive configuration information from a base station configuring multiple slots for a transmission on an uplink control channel, wherein the configuration information indicates (1) a starting slot for the transmission on the uplink control channel, (2) a number of slots for the transmission on the uplink control channel, (3) a starting symbol in a slot for the transmission on the uplink control channel, and (4) a number of symbols in a slot for the transmission on the uplink control channel;

determine, according to the configuration information, a subsequent slot in the multiple slots and a symbol in the subsequent slot for the transmission on the uplink control channel, wherein a number of symbols available for carrying the transmission on the uplink control channel is greater than or equal to the configured number of symbols, and wherein one or more symbols in the subsequent slot for the transmission on the uplink control channel have a same position as one or more symbols in the starting slot according to the configuration information; and perform the transmission on the uplink control channel using at least the starting slot and the subsequent slot.

12. The apparatus of claim 11, wherein a capability of orthogonal cover code multiplexing is enabled for the starting slot and the subsequent slot for the transmission on the uplink control channel.

13. The apparatus of claim 11, wherein the processor is configured to:

perform frequency hopping for the transmission on the uplink control channel using the same capability of orthogonal cover code multiplexing in the subsequent slot as in the starting slot, wherein N consecutive slots from the starting slot are used for the transmission on the uplink control channel, the N consecutive slots including the starting slot.

14. The apparatus of claim 11, wherein the one or more symbols in each of the multiple slots are consecutive symbols.

15. The apparatus of claim 11, wherein the processor is configured to:

determine that a slot is not used for the transmission on the uplink control channel due to the slot not having the configured number of symbols.

16. An apparatus for wireless communication, comprising:

a processor; and a memory including processor executable code, wherein the processor executable code upon execution by the processor configures the processor to:

transmit configuration information to a user equipment configuring multiple slots for a transmission on an uplink control channel, wherein the configuration information indicates (1) a starting slot for the transmission on the uplink control channel, (2) a number of slots for the transmission on the uplink control channel, (3) a starting symbol in a slot for the transmission on the uplink control channel, and (4) a number of symbols in a slot for the transmission on the uplink control channel; and receiving, by the base station, the transmission on the uplink control channel from the user equipment using at least the starting slot and a subsequent slot, wherein the subsequent slot and a symbol in the subsequent slot for the transmission on the uplink control channel are determined according to the configuration information, wherein a number of symbols available for carrying the transmission on the uplink control channel is greater than or equal to the configured number of symbols, and wherein one or more symbols in the subsequent slot for the transmission on the uplink control channel have a same position as one or more symbols in the starting slot according to the configuration information.

17. The apparatus of claim 16, wherein N consecutive slots from the starting slot are used for the transmission on the uplink control channel, and wherein the N consecutive slots include the starting slot.

18. The apparatus of claim 16, wherein a capability of orthogonal cover code multiplexing is enabled for the starting slot and the subsequent slot for the transmission on the uplink control channel.

19. The apparatus of claim 16, wherein frequency hopping is performed for the transmission on the uplink control channel using the same capability of orthogonal cover code multiplexing in the starting slot as in the subsequent slot.

20. The apparatus of claim 16, wherein the one or more symbols in each of the multiple slots are consecutive symbols.

* * * * *